United States Patent [19]

Corallo et al.

[11] Patent Number: 5,306,461
[45] Date of Patent: Apr. 26, 1994

[54] EXTRUSION BLOW MOLDING OF FILLED LIQUID CRYSTAL POLYMERS

[75] Inventors: Cheryl F. Corallo, Charlotte, N.C.; Robert B. Sandor, Cliffside Park, N.J.; Ralph S. Blake, Lake Wylie, S.C.; Derrick B. McKie, Brooklyn, N.Y.

[73] Assignee: Hoechst Celanese Corporation, Somerville, N.J.

[21] Appl. No.: 967,896

[22] Filed: Oct. 28, 1992

[51] Int. Cl.⁵ .............................................. B29C 49/04
[52] U.S. Cl. .................................................... 264/540
[58] Field of Search ........................................ 264/540

[56] References Cited

U.S. PATENT DOCUMENTS

| | | | |
|---|---|---|---|
| 4,438,236 | 3/1984 | Cogswell et al. | 524/27 |
| 4,540,737 | 9/1985 | Wissburn et al. | 524/599 |
| 4,799,985 | 1/1989 | McMahon et al. | 156/166 |
| 4,906,724 | 3/1990 | Yamanaka et al. | 528/194 |
| 4,942,005 | 7/1990 | Pollock et al. | 264/537 |
| 5,085,807 | 2/1992 | Okamoto et al. | 252/602 |
| 5,150,812 | 9/1992 | Adams | 220/414 |

OTHER PUBLICATIONS

"Plastics World," Jul., 1988, p. 11.
"Advanced Material," 10(10), Jun. 27, 1988, p. 2.
Blizard, K. G. et al., "Blow Molding Thermotropic Liquid Crystalline Polymers", Intern. Polymer Processing IV, 1989, Hanser Publishers, Munich.
Vectra ® Product literature, Hoechst Celanese Corporation 1989.

Primary Examiner—Catherine Timm
Attorney, Agent, or Firm—R. H. Hammer, III

[57] ABSTRACT

An extrusion blow molding process for a filled, liquid crystalline polymer is provided. By the process, molten polymer having improved melt strength, is vertically extruded downward into space through a parison-forming, annular gap. Sag resistant parisons are formed. Beneficially, the parisons may be formed periodically. Advantageously, large-sized parts or structures may be produced.

8 Claims, 1 Drawing Sheet

EXTRUSION BLOW MOLDING OF FILLED LIQUID CRYSTAL POLYMERS

FIELD OF THE INVENTION

This invention relates to extrusion blow molding a liquid crystalline polymer.

BACKGROUND OF THE INVENTION

Extrusion blow molding is useful for making hollow parts or structures having a variety of uses. Containers such as tanks, pressure vessels, cylinders and bottles, which may be used for pressurized or compressed gases and cryogenic gases, may be conveniently formed by extrusion blow molding.

Liquid crystal or crystalline polymers (LCPs) are beneficially characterized by gas barrier properties, chemical resistance or inertness, high creep resistance, excellent retention of properties over a broad temperature range including lack of embrittlement at cryogenic temperatures, and a low coefficient of thermal expansion. However, liquid crystalline polymers are difficult to process by extrusion blow molding.

According to *Plastics World*, p. 11, July 1988 and *Adv. Mater.*, 10 (10), p. 2, Jun. 27, 1988, a moldable LCP is known. The LCP may be crystalline and moldable in 30% and 50% glass-reinforced formulations, or may be amorphous and extrudable, blow moldable and injection moldable in neat, glass-reinforced and glass/mineral formulations.

In continuous extrusion blow molding, parisons are continually formed and molds move into place to accept tubes of molten polymer. Continuous extrusion blow molding to impart biaxial orientation to a part made from an unfilled copolyester LCP (hydroxybenzoic acid and 6-hydroxy-2-naphthoic acid), has been attempted. In this regard, Blizard and Baird, *Intern. Polymer Processing*, 4: 72–178 (1989), report forming a small part having no observed biaxial orientation, and rapid solidification to be a processing limitation. However, they report success and the benefit of relatively slow crystallization for a copolyester made from hydroxybenzoic acid and polyethylene terephthalate using a lower die temperature than was needed for processing the unfilled copolyester LCP.

Processing difficulties are accentuated when a large-sized part is desired, and also when a part or structure is desired for its gas barrier properties and uniformity of wall thickness becomes paramount. Therefore, there is a need for an improved process for extrusion blow molding liquid crystalline polymers, and in particular for forming a liquid crystalline polymer into a part or structure to be used for its gas barrier properties.

SUMMARY OF THE INVENTION

In accordance with the present invention, a broadly applicable, extrusion blow molding method for forming a hollow part or structure from a filled, liquid crystal or crystalline polymer, is provided. In accordance with the invention, a filled, liquid crystalline polymer is heated to a molten state, and in particular to a temperature suitable for extruding the polymer in the form of a sag resistant, stable parison. Beneficially, sag resistance and extrusion blow moldability are provided by addition of an inorganic filler such as glass or mineral fiber.

Thereafter, intermittent extrusion may be advantageously used to periodically form parisons. In this step, a shot of the polymer melt is vertically extruded through an annular gap, generally downward into space to form a parison. Sag resistance and stability of the parison are important. At an appropriate time, typically after the parison has fallen to a desired length, a forming mold is clamped around the parison, and the parison is inflated causing it to take on the cavity form. After a suitable period of time for cooling, the mold is opened to provide the formed part or structure, which advantageously may range in size depending upon the mold selected. Parts or structures of sufficiently uniform wall thickness to be suitable for pressurized or compressed gases and cryogenic gases, may be formed.

DESCRIPTION OF THE DRAWING

By the drawing there is schematically illustrated one approach for carrying out the present invention.

DETAILED DESCRIPTION OF THE INVENTION

Figure 1:
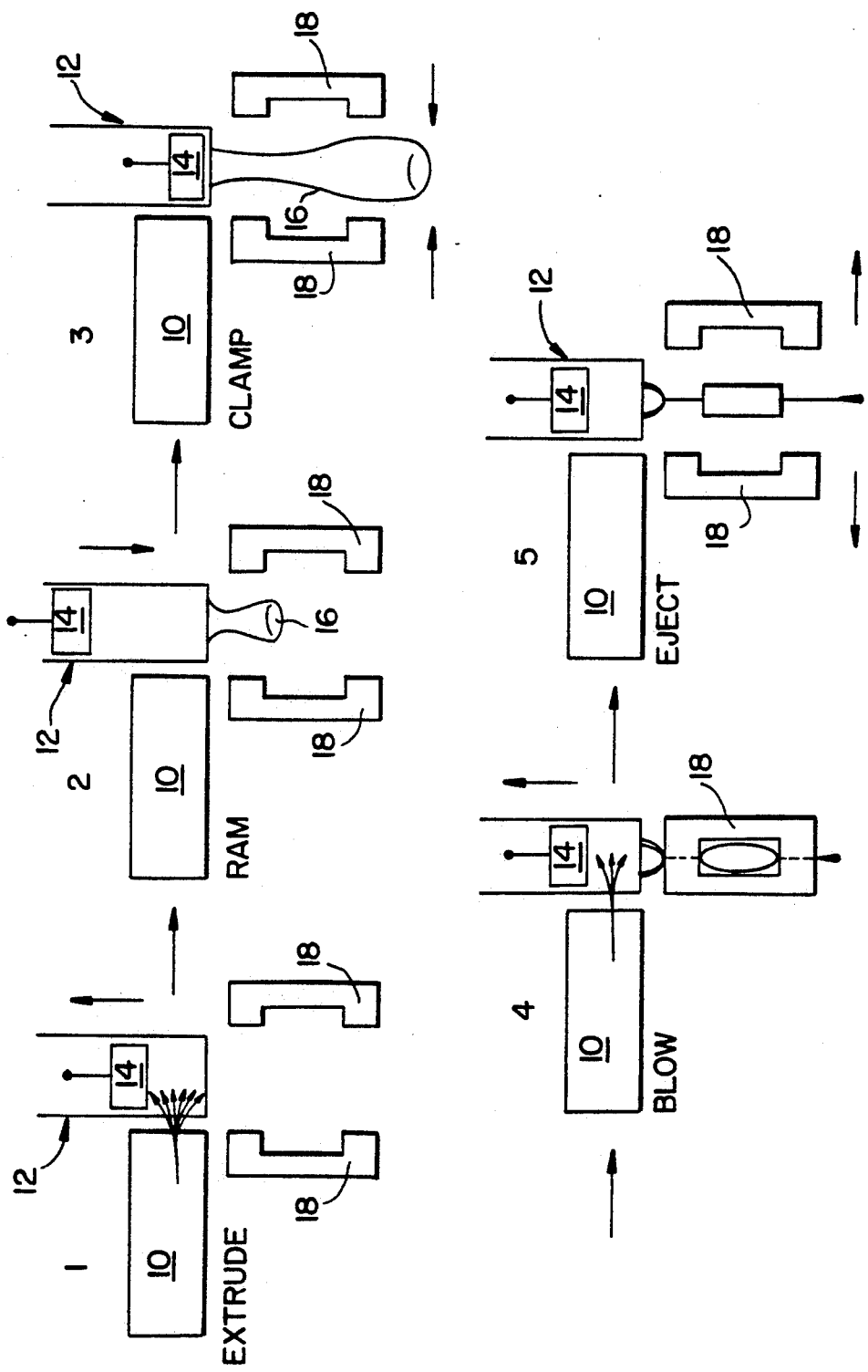

As indicated above, the present invention is directed to a method of broad applicability for extrusion blow molding a liquid crystalline polymer. The present invention beneficially utilizes a filled, liquid crystalline polymer. By the invention, a large or small, hollow part or structure such as a container useful for its gas barrier properties, and a gas barrier liner for a high performance, filament wound, pressure vessel, may be economically and easily produced.

The term "liquid crystal or crystalline polymer" as used in connection with this invention, shall mean a non-amorphous, liquid crystal or crystalline polymer. Particularly beneficial as filled polymers for use in the process of the present invention, are thermotropic LCPs.

Thermotropic LCPs exist in a liquid-crystalline state above their melting point, are anisotropic in the melt phase, and are melt processable. Thermotropic LCPs include, but are not limited to, wholly and non-wholly aromatic polyesters, aromatic-aliphatic polyesters, aromatic polyazomethenes, aromatic polyester-carbonates, and wholly aromatic and non-wholly aromatic polyesteramides.

The most preferred thermotropic LCPs for use in this invention, include wholly aromatic polyesters. A variety of thermotropic LCPs are described in U.S. Pat. Nos. 4,540,737 and 4,799,985, which are hereby incorporated herein by reference. By the term "wholly aromatic polyester" as used in connection with this invention, is meant that the polyester backbone is made of aromatic monomers. Especially useful in this invention, is a wholly aromatic, thermotropic LCP prepared from p-hydroxybenzoic acid and 6-hydroxy-2-naphthoic acid monomers. The hydroxybenzoic acid and polyethylene terephthalate copolyester used by Blizard and Baird, is not an LCP as described herein.

In accordance with the present invention, a filled, liquid crystalline polymer is used. Accordingly, the liquid crystalline polymer beneficially includes a melt strength-enhancing filler which may be, for example glass fiber or mineral fiber. Thus, it will be understood that an unfilled, liquid crystalline polymer such as was used with limited success by Blizard and Baird in a continuous, extrusion blow molding process, would not be useful in the process of the present invention.

A suitable filler may have a generally cylindrical shape and be for instance a glass fiber. A glass fiber useful as a filler, may be short for instance, 0.2 to 0.3 mm in length, may be long such as ⅛ to 1 inch in length, or may be of intermediate length. Suitable glass fibers include a glass fiber 0.2 to 0.3 mm in length and nominally ten microns in diameter, and one-half inch in length and nominally sixteen microns in diameter.

A suitable filler may be generally needle-shaped and be for example a mineral fiber. Useful mineral fillers include calcium sulfate with an aspect ratio of about 15–20:1 and a mean diameter of about 2 microns, and calcium metasilicate with an aspect ratio of about 20:1 and an average diameter of about 3.5 microns. The calcium sulfate material is commercially available from Nyco under the registered trade mark Franklin fiber, and the calcium metasilicate material is commercially available from U.S. Gypsum under the trade name Wollastikup®. Generally speaking, other inorganic fillers may be used so long as the necessary melt strength-enhancing function is provided.

A suitable melt strength is proven by the formation of a sag resistant, stable parison. However, high viscosity does not necessarily correlate to the necessary sag resistance and stability. Thus, we have found that a high viscosity, but unfilled, liquid crystalline polymer commercially available under the trade name Vectra® B950, would not be suitable for use in the process of the present invention. Moreover, good sag resistance alone may not be sufficient; rather, the filled LCP must also be characterized by good blow moldability as exemplified by complete filling of a mold and accurate replication of the interior mold surface.

The ratio of the filler to the liquid crystalline polymer will depend upon, for instance the size of the part or structure desired, and the particular filler selected. Also, for a fiber filler, consideration should be given to the fiber length and diameter. Generally speaking, a relatively larger part size will require relatively greater melt strength because of correspondingly greater hanging weight of the parison. In any event, the amount of filler selected will be sufficient to make the LCP production capable in an extrusion blow molding process.

The percentage of filler typically will beneficially be in the range of from about 1 to 30 wt.%, with relatively less filler, that is, about 5 to 10 or 12 wt.%, being generally preferred when long glass fiber is used due to significantly decreased blow moldability at levels greater than or about 15 wt.%. By comparison, mineral filler and short glass fiber filler are generally useful over a broad range of loading; however, for economic reasons, a loading in the 10 to 20 wt.% range may be selected.

The filler selected may further depend upon the intended end use of the part or structure to be formed by the extrusion blow molding process. Accordingly, for making a pressure vessel liner or a cryogenic dewar from a fiber-filled, liquid crystalline polymer, a filler requiring a relatively lower loading may be desirable to minimize any gas permeation and channeling resulting from the fiber.

In accordance with the extrusion blow molding process of the present invention, the filled, liquid crystalline polymer is heated to a temperature suitable for extruding a well-formed parison. This state may be attained by the combination of heat provided to the extruder and shear-induced heat generated during the extrusion process. The compression ratio of the extruder screw affects the heat generated by shear, with a relatively higher compression ratio resulting in enhanced shear-induced heat.

As may be understood, a suitable temperature will be greater than the temperature at which polymer solidification would take place but will be less than the temperature at which polymer degradation would occur or the parison would be unstable and sag or stretch, resulting for instance, in a highly non-uniform wall thickness. It will be understood that each filled, liquid crystalline polymer will have its own temperature range for extrusion blow molding.

Uniformity of wall thickness tends to be particularly problematic in a radius or corner, where material expansion tends to be the greatest, and is of special concern when extrusion blow molding a part or structure for containing pressurized or compressed gases and cryogenic gases. Typically, the polymer will be extruded as cool as possible to maximize melt strength, thereby providing for uniform wall thickness. However, there is, generally speaking, beneficially no need to use a lower die temperature than extruder barrel temperature.

When in accordance with the present invention, a suitable melt strength is provided and the molten polymer is extruded at an appropriate temperature, a well formed parison is produced. Otherwise, a parison having inconsistent wall thickness with local weakness, may be produced.

In accordance with the extrusion blow molding process of the present invention, intermittent extrusion is beneficially used to periodically form parisons after molten polymer is accumulated. Intermittent extrusion on a cycle, is effected by vertical extrusion of a shot of molten polymer through an annular gap, generally downward into space. Beneficially, intermittent extrusion permits the extrusion of a large volume of molten plastic in a short period of time. Larger parts or structures may be produced.

Sag resistance and stability of a parison in a gravity hung, molten or near molten state are focal points of an extrusion blow molding process having broad applicability in accordance with the invention. Parison hang time may range between 0.5 and 15 seconds depending upon the parison size, the filled LCP selected, the die gap and the rate of parison formation. Typically, compared to continuous extrusion blow molding, the hang time for intermittent extrusion blow molding may be significantly less in producing a part or structure of equal size. In making larger parts and structures, an LCP having a suitable melt strength will be extruded at a temperature that appropriately provides sag resistance for an increased polymer mass.

At an appropriate time, typically after the parison has fallen to a selected length, a forming mold is clamped around the parison. The mold is typically clamped around a center portion of the parison, and the clamped parison remains connected to the extruder. A fluid such as air, which may be preheated or cooled, is then blown into the clamped parison to form a molded part or structure. After a suitable mold hold time, the mold is opened and the formed part or structure is removed.

Accordingly, by the present invention, a broadly applicable method of extrusion blow molding a liquid crystalline polymer, has been provided. Without melt strength-enhancement and selection of an appropriate temperature for extrusion, extrusion blow molding of large-sized parts or structures from LCPs can be expected to be unsuccessful.

In an application of the extrusion blow molding process of the present invention using periodic parison formation, a suitable, filled liquid crystalline polymer is extruded at an appropriate temperature to form a stable parison, and the parison may be blow molded to provide a gas barrier, inner liner.

The forming mold may be heated, and as a result, resin content of the liner exterior surface may be increased. In other applications, a heated mold may beneficially provide an improved match of the exterior surface of the part or structure to the mold. Generally speaking, we have found that a mold temperature on the order of about 200 to 300° F., and perhaps beyond 300° F., is suitable for filled LCP's. Too hot a mold may result in detrimental blister formation.

Thereafter, using the liner as a mandrel, a conventional structural overwrap may be filament wound and consolidated onto the liner. The structural overwrap may be made of a composite material formed of high strength, reinforcing fiber within a matrix resin. Reference is hereby made to U.S. Pat. No. 5,150,812 to Peter M. Adams, which describes that an inner liner may be made by blow molding or filament winding, and may be formed from an LCP or other gas impermeable polymer. If desired, an outer gas barrier layer may be provided over the structural overwrap.

Schematically illustrated in the drawing is an extrusion blow molding process in accordance with the present invention using an accumulator machine. In step 1, an extruder 10 feeds thermally homogeneous, molten polymer to an accumulator head 12 having a annular gap (not shown). The extruder temperature combined with the heat-induced shear, may be used to heat polymer to the selected temperature. The accumulator capacity determines the size limit of large blown parts.

In the second step, at an appropriate time, a shot of molten polymer is ejected by a ram 14 vertically downward through the annular gap into space to form a parison 16. Use of the accumulator permits faster extrusion of a large parison.

In the third step, after the parison has fallen to the desired length, a forming mold 18 is clamped around the parison. In the fourth step, with the mold clamped around the parison, air is forced into the clamped parison, and in the fifth step, after a suitable period of time for cooling, the mold is opened to provide the formed part or structure.

In the Examples that follow and throughout this description and the claims set forth below, all procedures are carried out at ambient temperature and pressure, unless otherwise specified.

EXAMPLE 1

With reference to the drawing, a Hycon extruder is fed with a thermotropic LCP filled with 30 wt.% glass fiber nominally ten microns in diameter and 0.2 to 0.3 mm in length. The filled LCP is commercially available under the trade name Vectra ® A130. Operating parameters are as follows: tooling, 3" diameter divergent style; screw compression ratio, 2.25:1; temperature settings: feed, transition and metering portions of extruder, accumulator head, 485° F.; extrusion die, mandril, 505° F.; mold, 205° F.

Molten polymer accumulates within the head and a parison is formed from a shot of polymer melt extruded through the annular gap vertically downward into space. The extruded polymer is at a temperature of about 554° F. A mold in the form of a 5"×11" plaque with fine texture, is clamped around a center portion of the parison after the parison has fallen to a desired length. After the blowing step, the mold is opened and the formed part is removed.

The formed part or panel is a hollow plaque with the following dimensions: 5"×11"×½" with a wall thickness of approximately 0.075". The panel weighs about ½ lb.

The process is repeated by forming a parison from another shot of the polymer melt, clamping the mold around the parison, blowing, and so forth. The panels are found to be to specification.

EXAMPLE 2

The process of Example 1 is repeated using a thermotropic LCP filled with 15 wt.% glass fiber nominally ten microns in diameter and 0.2 to 0.3 mm in length, with modifications in the operating parameters (tooling, 4" divergent; temperature settings: extruder feed portion, 490° F.; transition and metering portions of extruder, accumulator head, 500° F.; extrusion die, 510° F.; mandril, 505° F.). In addition, a high compression ratio screw (3.5:1) at 77 rpm is used for greater shear and the forming mold is oil heated to a temperature of 250° F. The filled LCP is commercially available under the trade name Vectra ® A115.

The molten, filled polymer is found to have good blow moldability at temperatures around 540° F. About twice as good melt strength is observed at 534° F. The formed parts are 5"×11"×½" hollow plaques having excellent exterior surface detail. The process is versatile enough to run a larger part.

EXAMPLE 3

The process of Example 2 is repeated using a thermotropic LCP filled with 7.5 wt.% glass fiber provided by blending Vectra ® A130 with an unfilled thermotropic LCP commercially available under the trade name Vectra ® A950, with modifications in the operating parameters (temperature settings: feed portion of extruder, 490° F.; transition and metering portions of extruder, 480° F.; accumulator head, extrusion die, mandril, 490° F.).

The molten polymer is found to process well at a temperature of about 540° F. The formed part is a 5"×11"×½" hollow plaque. The process is considered to be production capable.

EXAMPLE 4

The process of Example 2 is repeated using a thermotropic LCP filled with 10 wt.% glass fiber provided by blending Vectra ® A130 with Vectra ® A950 (unfilled LCP). The molten polymer is found to process well at a temperature of 544° F. The formed part is a 5"×11"×½" hollow plaque. The process is considered to be production capable.

EXAMPLE 5

The process of Example 2 is repeated using a thermotropic LCP filled with 30 wt.% Franklin fiber and commercially available under the trade name Vectra ® A530, with modifications in the operating parameters (tooling, 3.5"; compression ratio, 2.25:1; temperature settings: feed portion of extruder, 495° F.; transition portion of extruder, 490° F.; metering portion of extruder, accumulator head, die tip 485° F.).

A temperature of 534° F., which is at the low end of the processing range for this melt strength-enhanced LCP, yields the most stable parison and process. A temperature of about 548° F. is found to be at the high end of the range.

The formed part is a 5"×11"×½" hollow plaque having a wall thickness of about 0.120". The surface detail is excellent. The process is versatile enough to run a larger part.

COMPARATIVE EXAMPLE

The process of Example 5 is repeated using an unfilled thermotropic LCP commercially available under the trade name Vectra ® B950 and having a substantially increased viscosity compared to Vectra ® A950. The unfilled polymer is found to have poor melt strength even at temperatures of 540° F., which is near the low end of the processing range. Very dark caramel colored streaks are found in the formed parts and the interior surface appears to be degraded. The high viscosity, but unfilled, polymer is considered not to be useful in the process of the present invention.

EXAMPLE 6

A Kautex accumulator extruder is fed with a thermotropic LCP filled with 15 wt.% glass and commercially available under the trade name Vectra ® A115. Operating parameters are as follows: tooling, 4.33" divergent; compression ratio, 2.25:1; temperature settings: feed portion of extruder 560° F., transition portion of extruder 560° F., metering portion of extruder, accumulator head, die tip 540° F.; mold, 250° F.

Molten polymer accumulates within the head and a parison is formed from a shot of polymer melt extruded through the annular gap vertically downward into space. The extruded polymer is at a temperature of about 538° F. A test mold in the form of an 18" long, 6" diameter container having 1" long, 1" diameter threads at each end, is clamped around the parison after the parison has reached a desired length. After the blowing step, the mold is removed and the successfully formed part is removed from the extruder.

The process is repeated by forming a parison from another shot of the polymer melt, clamping the parison and so forth. The cycle time is 90 seconds overall.

A temperature of about 526° F. is found to be at the low end of the range at which the melt strength-enhanced polymer will blow mold, and a temperature of about 584° F. is found to be at the high end of the range. A temperature of 538° F. produces the most stable parison. A mold hold time of about 46 seconds provides improved thread definition.

Good blow moldability is evidenced by thin-walled, containers that accurately reproduce the interior surface detail of the forming mold. The containers have wall thicknesses of 0.060" and 0.085" and average about 1.25 lbs.

COMPARATIVE EXAMPLES AND EXAMPLES 7–16

Additional extrusion blow molding data using periodic parison formation and a Hycon extruder, are now described with reference to the Table. The first two runs are with Vectra ® A910 and Vectra ® A950 (both unfilled LCPs). No part is obtained.

TABLE

| Additive | Matrix | Mold Success Rating | Sag Time (sec.) | Temp. (°F.) |
|---|---|---|---|---|
| — | A910 | 0 | 0.93 | 567 |
| — | A950 | 0 | 0.63 | 572 |

TABLE -continued

| Additive | Matrix | Mold Success Rating | Sag Time (sec.) | Temp. (°F.) |
|---|---|---|---|---|
| Short glass | | | | |
| 3% | A950/A910 | 4 | 1.57 | 577 |
| 10% | A950/A910 | 5 | 2.69 | 573 |
| 15% | A950 | 5 | 3.72 | 584 |
| 30% | A950 | 4/5 | 2.00 | 578 |
| Wollastikup | | | | |
| 15% | A950/A910 | 5 | 1.43 | 552 |
| 30% | A950/A910 | 5 | 1.30 | 549 |
| 40% | A950 | 5 | 1.39 | 554 |
| Franklin | | | | |
| 15% | A950/A910 | 4 | 1.69 | 566 |
| 30% | A950 | 5 | 1.27 | 565 |
| 40% | A950 | 5 | 1.04 | 556 |

Mold Success Rating:
0 = no part
4 = production capable
5 = production capable and versatile enough to run a larger part Other runs (Examples 7–16) are with a glass fiber nominally ten microns in diameter and 0.2 to 0.3 mm in length ("short glass"), Wollastikup mineral filler, and Franklin fiber. The 3% and 10% short glass variants are prepared by cutting Vectra ® A115 with an appropriate amount of A910. Likewise, the 15% and 30% Wollastikup variants are made by cutting 40% Wollastikup in a Vectra ® A950 matrix, with an appropriate amount of A910. Similarly, the 15% Franklin fiber variant is made by cutting 30% Franklin fiber in a Vectra ® A950 matrix, with an appropriate amount of A910.

The parison sag time is an average of two trials, with five parisons extruded and evaluated per trial. The time for a 18" length parison to sag 6" is measured. The resin temperature is obtained from resin extrudate, and is an average of a temperature before the first trial, a temperature between the two trials, and a final temperature.

The benefit of extrusion blow molding a filled, compared to an unfilled, thermotropic LCP, is clearly shown by the results of the Table. A filled polymer blend may be used.

The process of the present invention may be carried out with various modifications without departing from the spirit or essential attributes thereof, and accordingly, reference should be made to the appended claims, rather than to the foregoing specification as indicating the scope of the invention.

We claim:

1. A method for extrusion blow molding a liquid crystalline polymer, said method comprising providing a molten, filled, liquid crystalline polymer at a suitable parison-forming temperature, said polymer consisting essentially of a wholly aromatic polyester, and containing a melt-strength enhancing filler parison by vertically extruding the polymer melt generally downward into space; clamping a forming mold around said parison; blowing a gas into the clamped parison to form a molten part; and opening said mold to provide the formed part.

2. The extrusion blow molding method of claim 1, wherein said filled, liquid crystalline polymer includes a melt strength-enhancing, inorganic filler.

3. The extrusion blow molding method of claim 2, wherein about 1 to 30 wt.% of said inorganic filler is present.

4. The extrusion blow molding method of claim 2, wherein about 5 to 12 wt.% of said inorganic filler is present and is long glass fiber.

5. The extrusion blow molding method of claim 2, wherein about 10 to 20 wt.% of said inorganic filler is present and is short glass fiber.

6. The extrusion blow molding method of claim 2, wherein about 10 to 20 wt.% of said inorganic filler is present and is mineral filler.

7. The extrusion blow molding method of claim 1, wherein said liquid crystalline polymer is a wholly aromatic polyester made from p-hydroxybenzoic acid and 6-hydroxynaphthoic acid monomers.

8. The extrusion blow molding process of claim 1, wherein said forming mold is heated.

* * * * *